Patented Mar. 9, 1926.

1,576,292

UNITED STATES PATENT OFFICE.

THOMAS DOW AINSLIE, OF METUCHEN, NEW JERSEY, ASSIGNOR TO THE ROESSLER & HASSLACHER CHEMICAL COMPANY, OF NEW YORK, N. Y., A CORPORATION OF NEW YORK.

MANUFACTURE OF ARTICLES FROM WOVEN GOODS.

No Drawing.  Application filed January 19, 1926.  Serial No. 82,367.

*To all whom it may concern:*

Be it known that I, THOMAS DOW AINSLIE, a citizen of the United States, and resident of Metuchen, in the county of Middlesex and State of New Jersey, have invented certain new and useful Improvements in the Manufacture of Articles from Woven Goods, of which the following is a specification.

This invention relates to an improved process for the manufacture of sewed articles from woven goods, and has particular reference to the manufacture of multi-ply or seamed articles such as collars, cuffs, shirts, shirt bosoms, handkerchiefs, neckbands, underwear, aprons, dresses, coats, trousers, vests and the like from cotton, wool, linen, silk and other or mixed fibres.

The object of the invention is to effect a substantial saving in cost of manufacture and to improve the quality of such articles.

The invention is particularly applicable to large scale manufacture of soft, semi-soft, and stiff white collars, and as an example, without intending to limit myself thereby I will describe the application of the invention to large scale production of collars.

The invention comprises improvements upon United States Patent #1,480,541 to Ainslie and Levy, dated Jan. 15, 1924, it having been found in successful large scale operations under said patent that various additional steps and modifications not therein disclosed are desirable in order to speed up the process, to further reduce costs, to improve the quality, and to reduce the amount of unsatisfactory or defective product.

In said patent oversize blanks for articles such as collars, are cut from previously untreated unbleached piece goods as received from the mill. In the manufacture of articles from light weight goods, especially when the goods is cut on a bias, I found that some of the finished articles had individual raveled threads jutting from the sewed seams, or that the weave was distorted. I found that if the material was manipulated slowly and carefully in the operations preceding the sewing, little or no raveling tends to occur, but when operating speed was attempted to be increased to a maximum otherwise permitted by the equipment and skill of the operators, the cut pieces would be flipped and rubbed in numerous ways, and loose threads would appear. These threads might be partly inside and partly outside the finished edge. If the former, the smoothness of the article is affected, and if the latter, time and expense is caused in trimming, besides leaving roughness in the untrimmed places within the edge. I discovered that this raveling out or distortion of the weave could be prevented by setting or fixing the fibres before cutting, and thereby not only speed up the entire process, but produce better articles.

This setting of the weave so as to withstand the peculiar subsequent operations, in a collar for example, of infolding, assembling and sewing, can be effected in various ways. One is to schreiner the unbleached piece goods by heated, finely engraved heavy pressure rolls. Preferably, I apply a small amount of sizing or starch to the unbleached, uncut piece goods. This sizing is not sufficient to so stiffen the cloth as to make handling difficult. Some obstinate cloths as for example those of loose weave are given a further treatment in that, after sizing, the cloth is run through a calender and subjected to heat and considerable pressure. This forces the sizing into the fabric, and causes it to unite with the size normally added to warp threads by the weaver. The heat of the drums dries out the moisture, causing the threads of warp and woof to be held together. The light starch treatment has a further advantage. Some articles such as handkerchiefs are shaped by tearing; this tearing strains the cross threads and they, in contracting cause the torn edges to curl, rendering subsequent high speed hemming very difficult. The setting and the heat and pressure treatment minimizes this curling to a large degree.

Some of the cloths used require only the heat and pressure of the finely figured rolls of a schreiner to set the weave. These rolls cause the individual warp and woof threads to be slightly crimped together and thus sufficient set is secured to prevent raveling in the succeeding operations.

I have found that these setting treatments aid the sewing operator in another way. Some pieces of goods must be turned and then sewed, as in collars for example. Untreated goods have a tendency to return to their original flat condition while the treated goods tend to hold the form into which they were shaped.

My process thus starts by first setting the threads of preferably unbleached piece goods, but equally well applies to bleached or partly bleached goods. Subsequently the goods are cut to a definite predetermined size, enough larger than the desired finished article so that on shrinking after final bleaching the desired size will be obtained. After cutting, these blanks, in the case of collars for example, are infolded and then sewed together to form a rough oversize collar of unbleached goods; or, in the case of other articles such as handkerchiefs only hemming and stitching may be required. The term "assembling" as used in the claims then refers either to putting one or more parts together for a seam or the turning of edges as in hemming by sewing. Next, the unbleached oversized sewed articles are to be bleached and shrunk. This bleaching and shrinking is accomplished in one operation in a peroxide bath. This step can be considerably improved and speeded up by using strongly alkaline treating liquors, but, since peroxide baths have greater efficiency when used mildly alkaline, I prefer to subject the unbleached sewed articles to a preliminary alkaline scour before bleaching.

This preliminary scour consists in boiling the rough assembled articles, with or without pressure, in a solution containing for example sodium carbonate; other equivalent alkaline scours may be used. The scour cleanses the individual threads of the cloth of oil and dirt acquired from previous steps, and opens them up, and thus greatly increases their absorbency. This enables the operator to cut the time of bleaching since the bleach liquors will penetrate the cloth more rapidly. After this bleaching operation the collars are thoroughly washed and laundered. During the bleaching and subsequent laundering the oversize collar shrinks to the desired finished size.

I have found that a satisfactory alkaline scour consists of a solution of a soap and sodium carbonate. Following this scour the articles are washed with water and then put into the bleach. The normal peroxide bleach bath as disclosed in United States Patent 1,480,541 can now be used.

The preliminary alkaline scour, as noted, leaves the cloth fibres in an open condition. This is of great advantage in the tinting operation sometimes used following the bleaching. By "tinting" is here meant treating the articles after bleaching and washing, with a faint coloring solution such as a solution of acid violet or direct blue. Articles finished without the preliminary scour do not tint as well as the scoured articles; the scoured fibres tend to absorb the tint more uniformly and give a pleasing color. This tinting is varied to suit the manufacturer and may be entirely omitted. By this improved process, the objectionable difficulty of removing ravelings is avoided; the product is thereby smoother and of uniformly high quality; is better tinted; and enables a greater production from the same equipment. It will also be seen that after the preliminary setting and the cutting and infolding operations, subsequent operations are on the articles in mass, and conveniently are carried out in tubs or kettles without expensive mechanical equipment.

What I claim is:

1. Process of manufacturing an article from woven fabric which consists in setting piece goods, forming a rough oversized mutiple layer article therefrom, and bleaching and shrinking to size.

2. Process of manufacturing collars or the like from woven fabric which consists in setting piece goods, forming a rough oversized article therefrom, assembling and sewing said oversize article, bleaching and shrinking to the predetermined size, and laundering.

3. Process of manufacturing collars or the like from woven fabric which consists in setting unbleached piece goods by heat and pressure, forming a rough oversized article therefrom, assembling and sewing said oversize, unbleached article, bleaching and shrinking to the predetermined size, and laundering.

4. Process of manufacturing collars or the like from woven fabric which consists in sizing piece goods, forming a rough oversized article therefrom, assembling and sewing said oversize article, bleaching and shrinking to the predetermined size, and laundering.

5. Process of manufacturing collars or the like from woven fabric which consists in schreinering piece goods, forming a rough oversized article therefrom, assembling and sewing said oversize article, bleaching and shrinking to the predetermined size, and laundering.

6. Process of manufacturing collars or the like from woven fabric which consists in setting piece goods, forming a rough oversized article therefrom, assembling and sewing said oversize article, scouring, bleaching and shrinking to the predetermined size, and laundering.

7. Process of manufacturing collars or the like from woven fabric which consists in sizing unbleached piece goods with heat and pressure, forming a rough oversized article therefrom, assembling and sewing said oversize, unbleached article, scouring, bleaching and shrinking to the predetermined size, and laundering.

8. Process of manufacturing collars or the like from woven fabric which consists in setting unbleached piece goods by heat and pressure, forming a rough oversized article therefrom, assembling and sewing said oversize, unbleached article, scouring bleaching and shrinking to the predetermined size, and laundering.

9. Process of manufacuring collars or the like from woven fabric which consists in schreinering unbleached piece goods, forming a rough oversized article therefrom, assembling and sewing said oversize, unbleached article, scouring, bleaching and shrinking to the predetermined size, and laundering.

10. Process of manufacturing collars or the like from woven fabric which consists in lightly sizing piece goods, forming a rough oversized article therefrom, assembling and sewing said oversize article bleaching and shrinking to the predetermined size, and laundering.

11. Process of manufacturing collars or the like from woven fabric which consists in sizing piece goods with heat and pressure, forming a rough oversized article therefrom, assembling and sewing said oversize article, bleaching and shrinking to the predetermined size, and laundering.

12. Process of manufacturing collars or the like from woven fabric which consists in sizing unbleached piece goods with heat and pressure, forming a rough oversized article therefrom, assembling and sewing said oversize, unbleached article, subjecting to an alkaline scouring operation, bleaching and shrinking to the predetermined size, and laundering.

Signed at Perth Amboy in the county of Middlesex and State of New Jersey this 12 day of January A. D. 1926.

THOMAS DOW AINSLIE.